United States Patent
Holland

(10) Patent No.: US 7,913,242 B2
(45) Date of Patent: Mar. 22, 2011

(54) LOW COST, OPEN APPROACH FOR VEHICLE SOFTWARE INSTALLATION/UPDATING AND ON-BOARD DIAGNOSTICS

(75) Inventor: Steven W Holland, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1011 days.

(21) Appl. No.: 10/701,143

(22) Filed: Nov. 4, 2003

(65) Prior Publication Data

US 2005/0097541 A1      May 5, 2005

(51) Int. Cl.
G06F 9/44       (2006.01)
G06F 9/445      (2006.01)
G06F 7/00       (2006.01)
G05D 1/00       (2006.01)

(52) U.S. Cl. ............... 717/168; 717/178; 701/1; 701/36
(58) Field of Classification Search ........... 717/168–178
See application file for complete search history.

(56) References Cited

U.S. PATENT DOCUMENTS

| | | | |
|---|---|---|---|
| 6,282,469 B1 * | 8/2001 | Rogers et al. | 701/29 |
| 6,807,469 B2 * | 10/2004 | Funkhouser et al. | 701/33 |
| 6,892,216 B2 * | 5/2005 | Coburn et al. | 709/200 |
| 7,424,707 B2 * | 9/2008 | De Boer et al. | 717/173 |
| 2003/0014521 A1 * | 1/2003 | Elson et al. | 709/225 |
| 2003/0060953 A1 * | 3/2003 | Chen | 701/33 |
| 2003/0120395 A1 * | 6/2003 | Kacel | 701/1 |
| 2003/0163587 A1 * | 8/2003 | Knight et al. | 709/249 |
| 2003/0167345 A1 * | 9/2003 | Knight et al. | 709/249 |
| 2004/0019736 A1 * | 1/2004 | Kim et al. | 711/103 |

* cited by examiner

*Primary Examiner* — Michael J Yigdall
*Assistant Examiner* — Ben C Wang

(57) ABSTRACT

A vehicle software installation, upgrade, and diagnostic system for use in vehicle assembly, upgrade, and repair, includes a portable memory device, such as a USB flash disk. The device receives diagnostic information via an open architecture communications port of a vehicle, such as a USB port. An external processor has a complimentary open architecture communications port and is adapted to receive and analyze the diagnostic information from the portable device. According to various aspects, analysis of the diagnostic information verifies successful installation and testing of vehicle software transferred from the portable device to vehicle processors, identifies software versions resident on the vehicle and related upgrade history for download and installation of an appropriate software upgrade, and/or diagnoses vehicle problems in accordance with sensed vehicle conditions and predetermined fault detection criteria.

21 Claims, 2 Drawing Sheets

LOW COST, OPEN APPROACH FOR VEHICLE SOFTWARE INSTALLATION/UPDATING AND ON-BOARD DIAGNOSTICS

FIELD OF THE INVENTION

The present invention relates to vehicle software installation, upgrade, and diagnostic systems and methods, and particularly relates to an open architecture for transferring vehicle software and diagnostic information between vehicle processors and an external processor using a portable memory device.

BACKGROUND OF THE INVENTION

Today's vehicles typically have a specialized assembly line diagnostic link (ALDL) provided under the dash. Today's vehicle software installation process during assembly typically requires that a cable be inserted into the ALDL and that the vehicle remain in place for some time. Alternatively, a portable, external processor temporarily attaches to the vehicle steering wheel as the vehicle moves down the assembly line and connects to the ALDL. Post-assembly vehicle software upgrade processes therefore require dealers to have a dedicated external processor with a specialized communication port. Similarly, repair procedures typically require technicians to have portable, handheld diagnostic processors with specialized communication ports. These standard systems and methods suffer from utilization of a slow speed proprietary serial bus that must be physically connected to the on-board communications port for a potentially lengthy period of time.

The need remains for a system and method that lower costs while increasing flexibility. The need also remains for a smooth migration path as newer, faster, cheaper vehicle buses become the industry standard. The present invention fulfills these needs.

SUMMARY OF THE INVENTION

A vehicle software installation, upgrade, and diagnostic system for use in vehicle assembly, upgrade, and repair, includes a portable memory device, such as a USB flash disk. The device receives diagnostic information via an open architecture communications port of a vehicle, such as a USB port. An external processor has a complimentary open architecture communications port and is adapted to receive and analyze the diagnostic information from the portable device. According to various aspects, analysis of the diagnostic information verifies successful installation and testing of vehicle software transferred from the portable device to vehicle processors, identifies software versions resident on the vehicle and related upgrade history for download and installation of an appropriate software upgrade, and/or diagnoses vehicle problems in accordance with sensed vehicle conditions and predetermined fault detection criteria.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
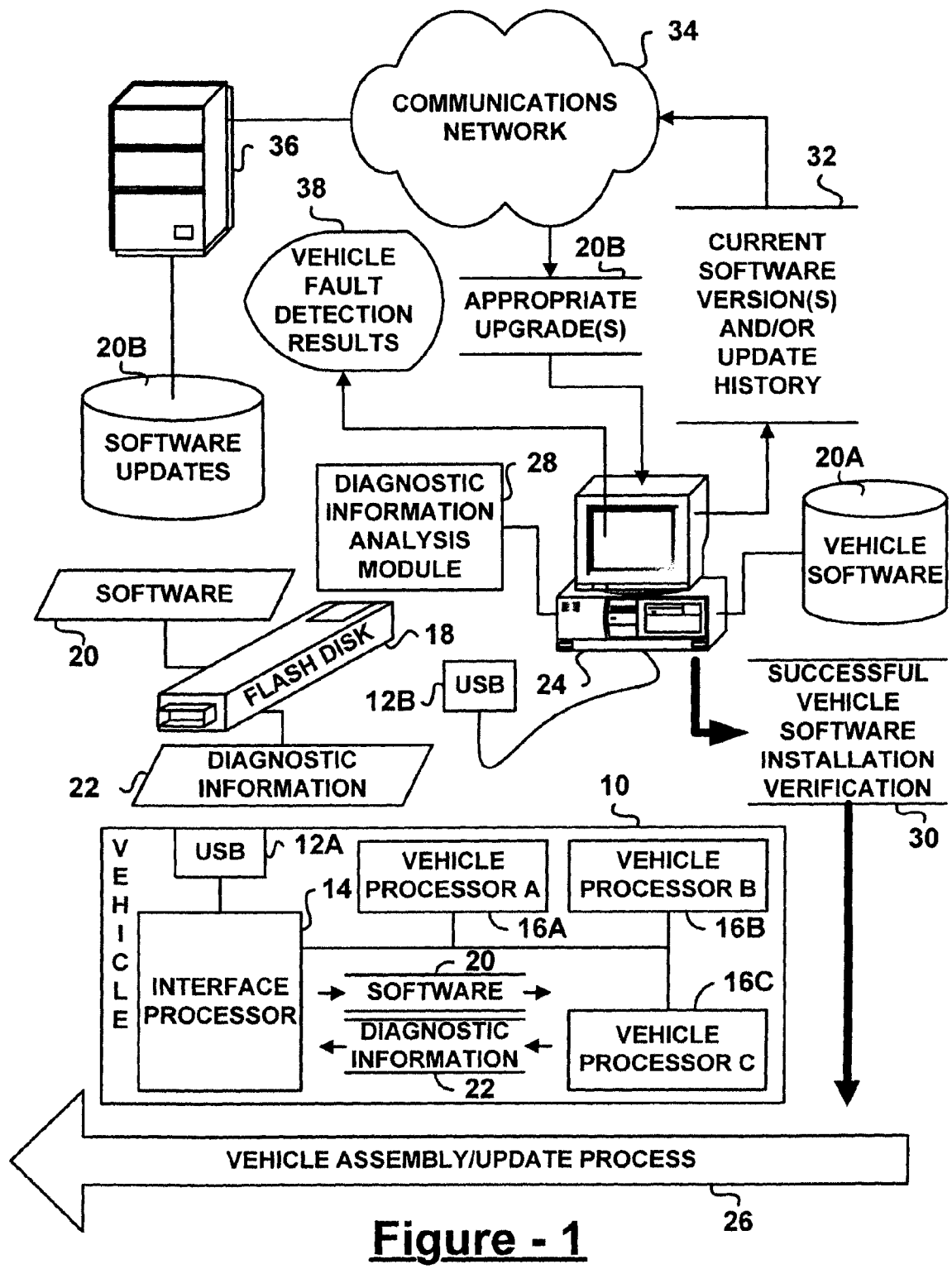
FIG. 1 is a combination functional block and entity relationship diagram illustrating the vehicle and the vehicle software installation, upgrade, and diagnostic system according to the present invention.

Referring to FIG. 1, the vehicle 10 according to the present invention has an open architecture communications port 12A in communication with an interface processor 14. The open architecture communications port 12A is selected based on high speed, low price, and compatibility with inexpensive and commonly available processors. The present invention leverages the high speed and low cost of the port along with its compatibility to widely deployed and available personal computers. Thus, the selection of the specific port may, for example, be matched to the most common port being deployed with personal computers. A typical and currently preferred example is the conventional universal serial bus (USB) port. However, this port could instead be replaced by other yet-to-be-designed standard interfaces. Alternative ports could be firewire or any future ports not yet widely in use. The USB or other port is provided to the vehicle and may be located in any convenient location. For example, the port 12A may be located underneath the dash board on the driver's side of the vehicle. The port 12A is preferably mounted so that the port 12A remains hidden from everyday view, and yet is easily accessible without difficulty in locating or reaching the port 12A. The port may be added onto to the vehicle in addition to the conventional ALDL computer port on that kind of vehicle. Ultimately, however, the port is intended to become the only such external port on the vehicle. The possibility of having two data ports is offered only to provide a graceful transition in the deployment of the invention.

The interface processor 14 is connected to a system bus of the vehicle, and is adapted to load software received over the port 12A onto multiple processors 16A-16C that are also connected to the system bus. For example, interface processor 14 may be adapted to parallel flash program multiple processors 16A-16C using a frame interleaving technique. It is envisioned that a portable memory device 18 is employed to communicate vehicle software 20 to interface processor 14. Thus, interface processor 14 has the bootstrapping software necessary to utilize portable memory device 18. In a preferred embodiment, portable memory device is selected based on speed, capacity, price, availability, and ability to interface with the port 12A. Therefore, portable memory device corresponds to a USB flash disk in a currently preferred embodiment where port 12A is a USB port. These disks are currently available in very large data capacities (64 MB, 128 MB, 256 MB, 512 MB). Also, these devices are very inexpensive relative to storage capacity. For example, 128 MB of storage space may be purchased in single quantity for under thirty dollars, and the disk fits into a small package the size of a small cigarette lighter. The USB flash memory disks are further extremely compatible with current personal computers. For example, a user can typically plug a USB flash disk into a USB port on any reasonably current PC or Macintosh computer and the disk will self mount. Special software is not usually required at all. Thus, the present invention can effectively employ a standard off-the-shelf USB flash disk or equivalent. All of the special handshaking software is similarly integrated into the vehicle interface processor's 14 initial memory. Thus, interface processor's 14 bootstrapping software corresponds to a driver that supports a USB flash memory device in a currently preferred embodiment. However, it is envisioned that other types of memory devices may be employed with the present invention as new types of memory devices and/or ports become available and market forces change.

The present invention reduces price and increases speed and convenience in vehicle assembly, upgrade, and repair procedures by utilizing portable memory device 18 to provide a convenient, high speed, low cost mechanism for transferring vehicle software 20 and diagnostic information 22 between onboard vehicle processors and external processor 24. As a result, an expensive, portable, dedicated external processor does not have to be provided to each vehicle on the line during vehicle assembly. Instead, external processor 24 may load vehicle software 20A onto device 18 via open architecture communications port 12B of external processor 24 based on the type of vehicle 10. It is envisioned that external processor 24 may maintain a carousel of devices 18 as vehicles 10 approach on an assembly line during an assembly process 26. Thus, it is only necessary to have one external processor on the assembly line, with several inexpensive, portable memory devices 18.

It is envisioned that an operator disconnects the next portable memory device 18 from external processor 24 and reconnects it to the port 12A of the vehicle 10. Then, as the vehicle 10 either remains in place or moves down the assembly line, interface processor 14 loads the software 20 onto the multiple processors 16A-16C. It is envisioned that the files of software 20 may be encrypted such that only the interface processor 14 program on-board a target vehicle 10 would be able to access the software and install it. It is also envisioned that software for multiple types of vehicles may be stored on one flash disk, and that interface processor 14 may be adapted to identify and load the appropriate files based on vehicle type. The multiple processors are adapted to automatically test the newly installed software 20 and transmit test results as diagnostic information 22 to interface processor 14. The testing function may be resident on the multiple processors as a result of installation of software 20, or it may be a function of software already resident on the multiple processors 16A-16C. In turn, interface processor 14 is adapted to transfer the diagnostic information 22 embodying the test results to the portable memory device 18.

It is also envisioned that, once the testing has finished, an operator disconnects the portable memory device 18 from the port 12A of the vehicle and reconnects it to the port 12B of the external processor 24. It is further envisioned that external processor 24 may in actuality be two separate processors in different locations on the assembly line that together from the external processor 24. Thus, external processor 24 accesses the diagnostic information 22 on the portable memory device 18 and uses diagnostic information analysis module 28 to verify that the software installation and testing procedure was successful. This verification 30 is provided as feedback to the assembly process 26.

Dealers and other software upgrade service providers similarly benefit from the ability to employ a personal computer or equivalent as an external processor 24 to provide upgrades to the vehicle 10 using a portable memory device 18. At the least, the need is eliminated for specialized, handheld devices that network with a server and are capable of interfacing with the ALDL. Thus, it is envisioned that an operator transfers a diagnostic program to the device 18 from the external processor 24 that is designed to determine what type of software is resident on the multiple processors 16A-16C as well as the entire software upgrade history. Then, the operator disconnects the memory device 18 from the external processor 24 and reconnects it to the vehicle 10. Interface processor 14 responds by communicating the software 20 to the multiple processors 16A-16C, which respond by writing out via interface processor 14 to the device 18 diagnostic information 22 indicating their software versions and update history. It is envisioned, however, that this function may be equivalently accomplished by allowing interface processor 14 to maintain a record of software installations and to provide the information to the device 18 upon request.

Once the diagnostic information 22 is obtained, the operator disconnects the device 18 from the vehicle and reconnects it to the external processor 24. In turn, external processor 24 sends a query 32 over communications system 34, such as the Internet, to a manufacturer's server 36. The query 32 preferably indicates the vehicle type, software versions, and update history so that the server 36 can determine an appropriate software upgrade 20B and communicate it to the external processor 24. Then, external processor 24 stores the new software on the device 18, and the operator essentially follows the same procedure as in the assembly process to install the software upgrade on the vehicle. It is envisioned that the appropriate software update may equivalently be identified by the external processor 24, rather than the server 36, so that query 32 merely needs to identify the needed upgrade to server 36. It is also envisioned that processor 24 may store and acquire the upgrades locally. It is further envisioned that the results of the software test may be communicated back to the manufacturer server 36. Appropriate encryption and security codes are preferably employed to prevent people other than authorized service providers from performing this function.

Dealers and other repair services providers also benefit from the ability to use the portable memory device to diagnose problems with the vehicle 10. In particular, repair service providers may dispense with expensive, specialized hand-held devices having ALDL connection capability. Instead, the diagnostic information 22 resulting from onboard vehicle fault detection can be transferred to external processor 24 for analysis via portable memory device 18. As a result, the same kind of open architecture port 12A on the vehicle and the same kind of portable memory device 18 may be used to extract diagnostic information from the vehicle's on-board computers for diagnosing problems. In the preferred embodiment, a flash disk would be preset via a standard PC to initiate a diagnosis function with the on-board multiple processors 16A-16C to generate and/or acquire pre-generated fault detection results based on sensed vehicle conditions and predetermined fault detection criteria. The on-board multiple processors 16A-16C write out all the diagnostic information into the flash disk via the interface processor 14. The flash disk is then read out by a standard personal computer being used as the external processor 24. Encryption and appropriate security codes may be employed to allow the manufacturer to control the process. The manufacturer might then sell the PC software to the dealership or other type of service group. As a result, the manufacturer retains control over the process, but still generates a profit from providing the advanced diagnostic capability to the end service provider. It is envisioned that some of the diagnostic information might be left readable by any PC as a normal text file, whereas the complex and more valuable information may only be interpreted by authorized users having purchased the package. This solution completely eliminates the expensive, custom hardware typically employed to provide this kind of function. It also allows for a very user friendly display 38 of the fault detection results to the person using the tool.

Figure 2:
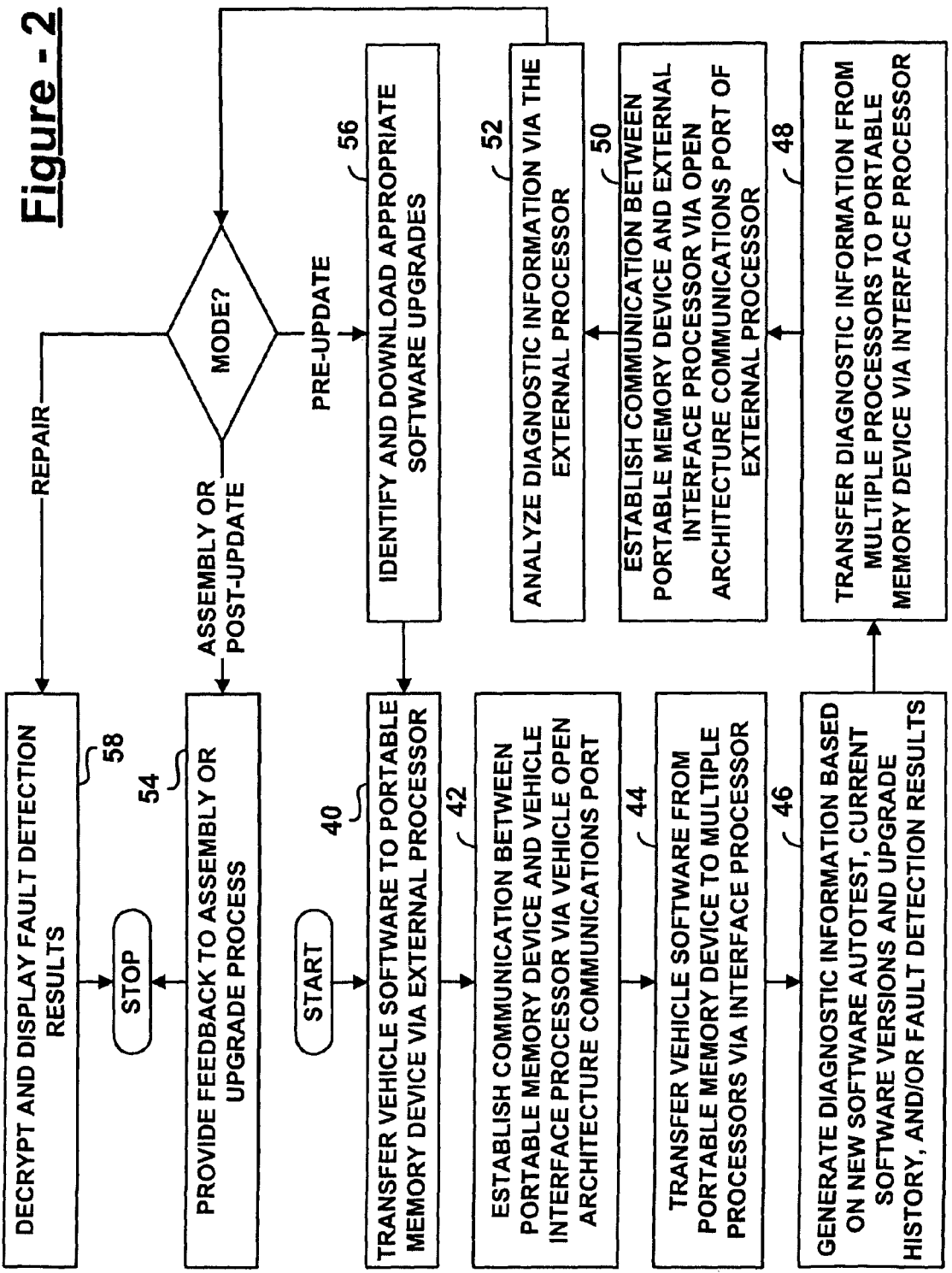
FIG. 2 is a flow diagram illustrating the vehicle software installation, upgrade, and diagnostic method according to the present invention.

Referring now to FIG. 2, the method according to the present invention typically begins with transferring vehicle software to the portable memory device via the external processor at step 40. It should be readily understood that the type of software stored on the device in step 40 may vary depending on the mode of operation of the present invention. For example, in an assembly mode, the vehicle software may correspond to supplemental software operable to adapt the multiple processors of the vehicle to properly operate their respective vehicle component systems. Also, in a first recursion of the method in an upgrade mode, hereinafter referred to as a pre-upgrade mode, the vehicle software may correspond to a driver, routine, or other trigger information adapted to cause interface processor 14 and/or multiple processors 16A-16C to write out their current software versions and entire upgrade history. Further, in a post-upgrade mode during a second recursion of the method, vehicle software may correspond to an upgrade to supplemental software operable to adapt the multiple processors of the vehicle to properly operate their respective vehicle component systems. Finally, in a repair mode, the vehicle software may correspond to a driver, routine, or other trigger information adapted to cause interface processor 14 and/or multiple processors 16A-16C to perform diagnostic functions according to sensed vehicle conditions and predetermined fault detection criteria, and/or to write out previously generated fault detection results.

At step 42, the method continues with establishing communication between the portable memory device and vehicle interface processor via the open architecture communications port of the vehicle. For example, this step typically involves disconnecting the portable memory device from the open architecture communications port of the external processor. Also, this step may be performed by an individual, such as a vehicle assembly line worker or repair and/or upgrade technician. Further, it is envisioned that this step may be performed by an automated system, such as a robot on an assembly line.

At step 44, the vehicle software is transferred from the portable memory device to multiple processors of the vehicle via the interface processor of the vehicle. For example, in an assembly mode or post-upgrade mode, the interface processor loads identifies the appropriate files for each of the multiple processors and loads them onto the respective processors. Also, in a pre-upgrade mode or repair mode, the interface processor may load the files onto the multiple processors; alternatively, it is envisioned that the interface processor may equivalently access the software for the multiple processors.

At step 46, diagnostic information is generated based on a new software autotest, current software versions and upgrade history, and/or fault detection results. For example, in an assembly mode or post-upgrade mode, the multiple processors autotest the newly installed software or software version to generate the diagnostic information. Also, in a pre-update mode, the current software versions and upgrade history are accessed by the multiple processors and/or interface processor to generate the diagnostic information. Further, in a repair mode, fault detection results are generated by the multiple processors based on sensed vehicle conditions and predetermined fault detection criteria; equivalently, it is envisioned that pre-generated and stored fault detection results may be accessed to generate the diagnostic information.

At step 48, the diagnostic information is transferred from the multiple processors to the portable memory device via the interface processor. For example, the multiple processors may write out to the portable memory device their auto-test results, fault detection results, and/or current software versions and upgrade history. Equivalently, it is envisioned that in a pre-upgrade or repair mode the interface processor may write out pre-stored information that may have been received from the multiple processors, or may have been stored during transfer to the multiple processors.

At step 50, the method continues with establishing communication between the portable memory device and the external interface processor via the open architecture communications port of the external processor. For example, this step typically involves disconnecting the portable memory device from the open architecture communications port of the vehicle. Also, this step may be performed by an individual, such as a vehicle assembly line worker or repair and/or upgrade technician. Further, it is envisioned that this step may be performed by an automated system, such as a robot on an assembly line.

At step 52, the external processor analyzes the diagnostic information stored on the portable memory device. For example, in an assembly or post-update mode, the external processor verifies successful installation and testing of the newly installed software and provides feedback to an assembly or upgrade process at step 54. Also, in a pre-update mode, the external processor formulates a query for transmission over a communications network to a manufacturer's server, thereby identifying and downloading one or more appropriate software upgrades at step 56; equivalently, it is envisioned that the external processor may identify the appropriate upgrades based on the current software versions and update history, and/or access the appropriate upgrades on local memory. Further, in a repair mode external processor decrypts and displays fault detection results at step 58. Finally, the method ends after steps 54 and 58, but not after step 56; instead, a second recursion is enjoined and the mode switches from pre-update to post-update.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A software management system for use in a vehicle, comprising:
    a portable memory device adapted to store software files and diagnostic information;
    multiple vehicle processors connected to a system bus of the vehicle and each adapted to generate diagnostic information indicating success of software installation on the respective vehicle processor, wherein the diagnostic information for each respective vehicle processor includes an indication of a software version installed on the respective vehicle processor;
    a communications port of the vehicle;
    an interface processor connected to the communications port and the system bus, wherein the interface processor is adapted to, when the portable memory device is connected to the communications port:
        identify software files stored on the portable memory device for each of the multiple vehicle processors,
        load the identified software files onto the multiple vehicle processors, and transmit the diagnostic information received from the multiple vehicle processors to the portable memory device; and an external processor having a communications port and adapted to receive the diagnostic information from the portable memory device and to analyze the diagnostic information to determine successful software installation on the vehicle.

2. The system of claim 1 wherein the communications ports of the vehicle and the external processor comprise open architecture communication ports.

3. The system of claim 2 wherein the communications ports of the vehicle and the external processor comprise universal serial bus ports, and the portable memory device comprises a universal serial bus drive.

4. The system of claim 1 wherein the portable memory device stores software files for multiple vehicle types, and the interface processor identifies the software files based at least in part on vehicle type.

5. The system of claim 1, wherein the multiple vehicle processors generate the diagnostic information by automatically performing self-tests on the installed software.

6. The system of claim 1 wherein:
the diagnostic information for each one of the vehicle processors indicates a software version resident on the one of the vehicle processors and upgrade history information corresponding to the one of the vehicle processors; and
the interface processor identifies software files stored on the portable memory device for each of the multiple vehicle processors based on the diagnostic information.

7. A vehicle comprising:
a communications port;
multiple vehicle processors connected to a system bus of the vehicle and adapted to generate diagnostic information indicating success of software installation on the multiple vehicle processors, wherein the diagnostic information indicates installed software versions on the multiple vehicle processors; and
an interface processor connected to the communications port and the system bus, wherein the interface processor is adapted to, when a portable memory device is connected to the communications port:
identify software files stored on the portable memory device for each of the multiple vehicle processors,
load the identified software files onto the multiple vehicle processors, and
transmit the diagnostic information received from the multiple vehicle processors to the portable memory device, wherein the diagnostic information is acquired from the portable memory device and analyzed by an external processor.

8. The vehicle of claim 7 wherein the communications port comprises an open architecture communication port.

9. The vehicle of claim 8 wherein the communications port comprises a universal serial bus port.

10. The vehicle of claim 7 wherein the portable memory device stores software files for multiple vehicle types, and the interface processor identifies the software files based at least in part on vehicle type.

11. The vehicle of claim 7 wherein the multiple vehicle processors generate the diagnostic information by automatically performing self-tests on the installed software.

12. The vehicle of claim 7 wherein the diagnostic information for each one of the vehicle processors indicates a software version resident on the one of the vehicle processors and upgrade history information corresponding to the one of the vehicle processors.

13. The vehicle of claim 12 wherein the interface processor identifies software files stored on the portable memory device for each of the multiple vehicle processors based on the diagnostic information.

14. A vehicle software installation method for use in vehicle assembly, comprising:
establishing communication between a portable memory device and an interface processor of a vehicle via a communications port of the vehicle, wherein the interface processor is connected to multiple vehicle processors of the vehicle via a system bus of the vehicle;
employing the interface processor to identify, for each of the multiple vehicle processors, software files on the portable memory device, and to load the software files received over the communications port onto the multiple vehicle processors;
installing the software files on the multiple vehicle processors;
transferring diagnostic information indicating success of software installation from the multiple vehicle processors to the portable memory device via the interface processor, wherein the diagnostic information indicates installed software versions on the multiple vehicles processors;
establishing communication between the portable memory device and an external processor via a communications port of the external processor; and
analyzing the diagnostic information via the external processor to determine success of software installation in the vehicle.

15. The method of claim 14 further comprising employing open architecture communications ports as the communications ports.

16. The method of claim 15 further comprising employing universal serial bus ports as the communications ports.

17. The method of claim 14 further comprising employing a universal serial bus drive as the portable memory device.

18. The method of claim 14 further comprising storing software files for multiple vehicle types on the portable memory device, and identifying the software files based at least in part on vehicle type.

19. The method of claim 14 further comprising generating the diagnostic information by automatically performing self-tests on the installed software.

20. The method of claim 14 wherein the diagnostic information for each one of the vehicle processors indicates a software version resident on the one of the vehicle processors and upgrade history information corresponding to the one of the vehicle processors.

21. The method of claim 20 further comprising identifying software files stored on the portable memory device for each of the multiple vehicle processors based on the diagnostic information.

* * * * *